United States Patent
Stanfield et al.

(10) Patent No.: US 12,266,928 B2
(45) Date of Patent: Apr. 1, 2025

(54) JUMP STARTING DEVICE WITH A JUMP START CURRENT SHARING SYSTEM, AND A JUMP START CURRENT SHARING METHOD

(71) Applicant: THE NOCO COMPANY, Glenwillow, OH (US)

(72) Inventors: James Richard Stanfield, Glendale, AZ (US); Nitish Agrawal, Phoenix, AZ (US); Andrea Carolina Hacker Davidson, Phoenix, AZ (US)

(73) Assignee: The NOCO Company, Glenwillow, OH (US)

( * ) Notice: Subject to any disclaimer, the term of this patent is extended or adjusted under 35 U.S.C. 154(b) by 498 days.

(21) Appl. No.: 17/756,782

(22) PCT Filed: Dec. 8, 2020

(86) PCT No.: PCT/US2020/070876
§ 371 (c)(1),
(2) Date: Jun. 2, 2022

(87) PCT Pub. No.: WO2021/119656
PCT Pub. Date: Jun. 17, 2021

(65) Prior Publication Data
US 2023/0344223 A1    Oct. 26, 2023

Related U.S. Application Data

(60) Provisional application No. 62/945,496, filed on Dec. 9, 2019.

(51) Int. Cl.
*H02J 1/10* (2006.01)
*H02J 7/00* (2006.01)
*H02J 7/34* (2006.01)

(52) U.S. Cl.
CPC ............ *H02J 1/122* (2020.01); *H02J 7/0042* (2013.01); *H02J 7/342* (2020.01)

(58) Field of Classification Search
CPC .......... H02J 1/122; H02J 7/0042; H02J 7/342
(Continued)

(56) References Cited

U.S. PATENT DOCUMENTS 4,816,818 A    3/1989   Roller
5,107,391 A    4/1992   Siepmann
(Continued)

FOREIGN PATENT DOCUMENTS

CN    110011371        7/2019
CN    110011371 A  *  7/2019  ............... B60Q 9/00
(Continued)

OTHER PUBLICATIONS

Patent Cooperation Treaty, PCT/US2020/070876, International Search Report and Written Opinion of the International Searching Authority, dated Mar. 4, 2021.
(Continued)

*Primary Examiner* — Richard V Muralidar
(74) *Attorney, Agent, or Firm* — Jones Day

(57) ABSTRACT

Provided is a jump starting device for charging a depleted discharge battery, the device includes a rechargeable battery having a positive terminal and negative terminal; a switch comprising a jump start current sharing circuit electrically connected to the rechargeable battery; and a battery clamp electrically connected to the jump start current sharing circuit.

20 Claims, 1 Drawing Sheet

(58) Field of Classification Search
USPC ........................................................ 320/105
See application file for complete search history.

(56) References Cited

U.S. PATENT DOCUMENTS

| | | | |
|---|---|---|---|
| 5,633,540 | A | 5/1997 | Moan |
| 2004/0066168 | A1 | 4/2004 | George et al. |
| 2017/0158082 | A1 | 6/2017 | Tahara |
| 2018/0345803 | A1* | 12/2018 | Nook ........................ H02J 7/342 |
| 2022/0069574 | A1* | 3/2022 | Liao .......................... H02J 1/122 |

FOREIGN PATENT DOCUMENTS

| | | |
|---|---|---|
| EP | 3308446 | 4/2018 |
| JP | S52-107337 | 8/1977 |
| JP | 2003-324843 | 11/2003 |
| JP | 2012-210110 | 10/2012 |
| JP | 2014-129820 | 7/2014 |
| JP | 2014-172602 | 9/2014 |
| JP | 2015-115979 | 6/2015 |
| JP | 2017-184333 | 10/2017 |
| JP | 2018-133891 | 8/2018 |
| JP | 2018-536789 | 12/2018 |
| JP | 2019-161693 | 9/2019 |
| JP | 2019-180156 | 10/2019 |
| WO | WO 2019/060552 | 3/2019 |

OTHER PUBLICATIONS

IP Australia, Appl. 2020403281, Examination Report, Feb. 1, 2023.
IP India, Appl. 202237029782, Examination Report, Feb. 16, 2023.
Canadian Intellectual Property Office, Appl. 3,164,049, Examination Report, Jun. 5, 2024.
IP Australia, Appl. 2023251503, Examination Report No. 1, Sep. 2, 2024.
CNIPA, Appl. 202080084424.4, First Office Action, Aug. 7, 2024.
Japan Patent Office, Appl. 2022-534654, Decision of Refusal, Aug. 27, 2024.
IP Australia, Appl. 2020403281, Examination Report, Feb. 28, 2023.
European Patent Office, Appl. 20898214.0, Extended European Search Report, Jan. 9, 2024.
Japan Patent Office, Appl. 2022-534654, Decision of Refusal, Feb. 6, 2024.
Canadian Intellectual Property Office, Appl. 3,164,049, Examination Report, Jul. 13, 2023.
Japan Patent Office, Appl. 2022-534654, Decision of Refusal, Jun. 13, 2023.
UK Intellectual Property Office, Appl. GB2207804.2, Examination Report, Mar. 26, 2024.
IP India, Appl. 202237029782, Hearing Notice, Feb. 23, 2024.

* cited by examiner

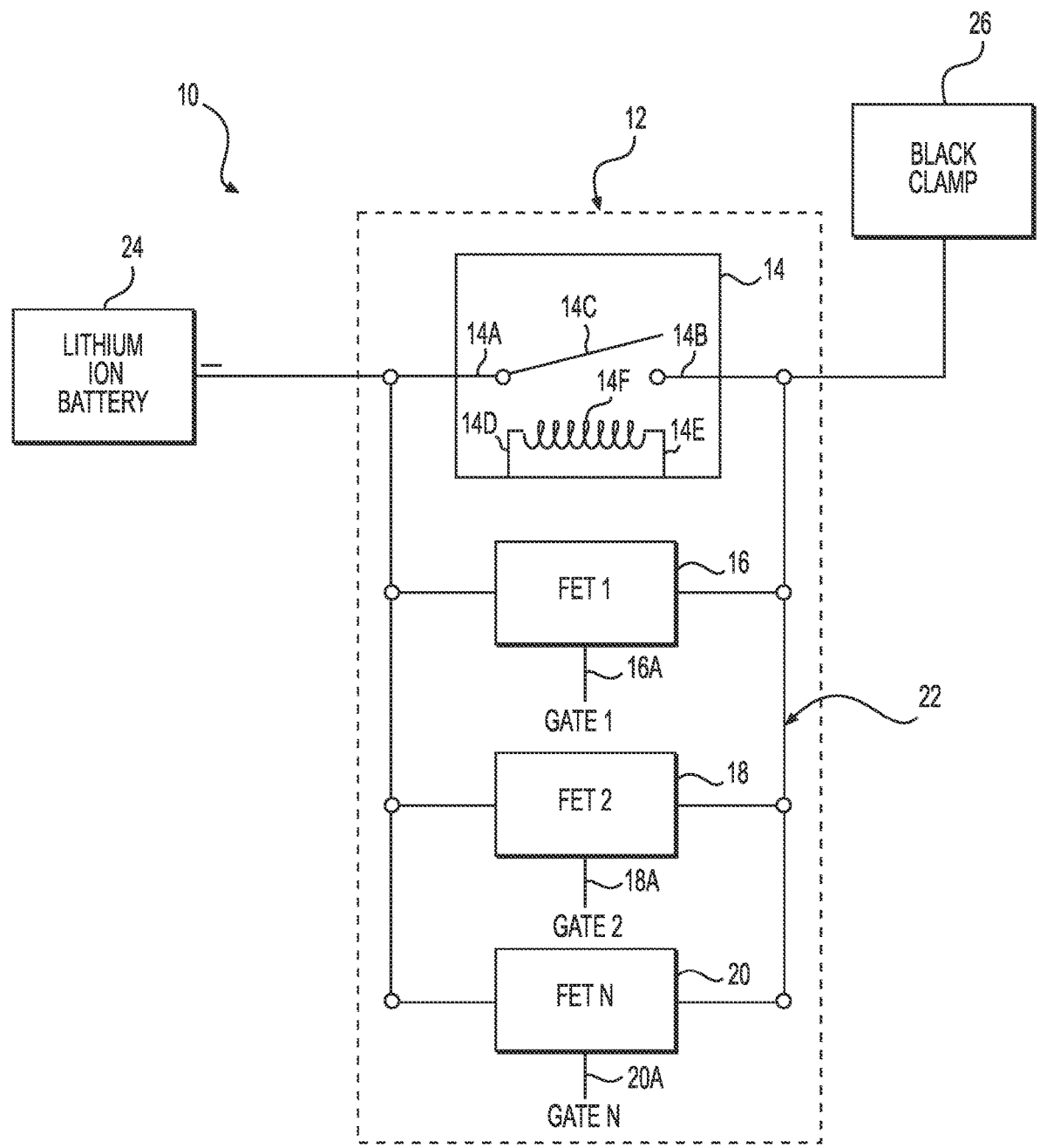

JUMP STARTING DEVICE WITH A JUMP START CURRENT SHARING SYSTEM, AND A JUMP START CURRENT SHARING METHOD

FIELD

The present invention is directed to a jump starting device with a jump start current sharing feature or system, and a jump start current sharing method, for example, for use with a jump starting device.

BACKGROUND

High current is required to jump start a vehicle. Typically, the larger the vehicle, the higher the current that is required. Cold weather makes jump starting a vehicle worse, since the mechanical parts of the engine are harder to move in cold conditions. A problem arises in how to deliver this high current to the vehicle battery. Lithium ion batteries are increasing in power delivery to the point where they can damage the conductors and switching devices if not designed properly.

In order to provide safety in use of a jump starter, a safety switch should be provided in the design. This safety switch when open does not allow power to be transferred to the jump starter battery clamps. When the safety switch is closed, power required to jump start the vehicle is provided to the battery clamps. The safety switch is typically either a relay or a field effect transistor (FET) design. The advantage of a relay is that it is very durable. The disadvantage of a relay is that the contacts can stick and it is relatively slow when opening or closing. The other disadvantage of a relay is that it typically takes up a lot of space within the jump starter.

The advantages of FET's are they are small in size, and they switch on and off very quickly. The disadvantages of FET's is that they tend to be more fragile (i.e. subject to thermal runaway and load sharing between FETs is critical).

There exists a need to provide an improved jump starter and method to overcome the problems discussed above.

SUMMARY

The jump starting device and jump start current sharing method according to the present invention comprises or consists of one or more relays and one or more field effect transistors (FETs) to combine or concentrate the strengths of one or more relays and one or more FETs while eliminating the weaknesses of relays and/or FETs. The one or more FETs can be added in parallel with the one or more relays to share current and minimize the space required by a larger relay. The one or more FETs can be switched on and off whenever needed, and can also be pulse width modulated (PMW) to control how much current gets shared between the one or more FETs and the one or more relays.

A conductor can be used to connect the one or more relays to the one or more FETs, and can be sized to control the amount of current that flows through the one or more relays and the one or more FETs to a battery clamp (e.g. negative battery clamp). The conductor, for example, can be copper or some other conductive metal, and can be stamped or formed into a shape for optimal connection (e.g. copper conductor, bus, plate, bar, beam, rod, conduit, pipe, cable) and located between the one or more relays and the one or more FETs.

The presently described subject matter is directed to an improved jump starting device for charging a depleted or discharged battery.

The presently described subject matter is directed to an improved jump starting device for charging a depleted or discharged battery, the device comprising a switch having one or more relays and one or more field effect transistors (FETs).

The presently described subject matter is directed to a jump starting device for charging a depleted is discharge battery, the device comprising: a rechargeable battery having a positive terminal and negative terminal; a switch comprising a jump start current sharing circuit electrically connected to the rechargeable battery; and a battery clamp electrically connected to the jump start current sharing circuit.

The presently described subject matter is directed to a jump starting device for charging a depleted is discharge battery, the device comprising: a rechargeable battery having a positive terminal and negative terminal; a switch comprising a jump start current sharing circuit electrically connected to the rechargeable battery; and a battery clamp electrically connected to the jump start current sharing circuit, wherein the switch comprises one or more relays and one or more field effect transistors (FETs) arranged in parallel in the jump start current sharing circuit.

The presently described subject matter is directed to a jump starting device for charging a depleted is discharge battery, the device comprising: a rechargeable battery having a positive terminal and negative terminal; a switch comprising a jump start current sharing circuit electrically connected to the rechargeable battery; and a battery clamp electrically connected to the jump start current sharing circuit, wherein the switch comprises a single relay and multiple field effect transistors (FETs) arranged in parallel in the jump start current sharing circuit.

The presently described subject matter is directed to a jump starting device for charging a depleted is discharge battery, the device comprising: a rechargeable battery having a positive terminal and negative terminal; a switch comprising a jump start current sharing circuit electrically connected to the rechargeable battery; and a battery clamp electrically connected to the jump start current sharing circuit, wherein the switch comprises multiple relays and a single field effect transistor (FET) arranged in parallel in the jump start current sharing circuit.

The presently described subject matter is directed to a jump starting device for charging a depleted is discharge battery, the device comprising: a rechargeable battery having a positive terminal and negative terminal; a switch comprising a jump start current sharing circuit electrically connected to the rechargeable battery; and a battery clamp electrically connected to the jump start current sharing circuit, wherein the switch comprises multiple relays and multiple field effect transistors (FETs) arranged in parallel in the jump start current sharing circuit.

The presently described subject matter is directed to a jump starting device for charging a depleted is discharge battery, the device comprising: a rechargeable battery having a positive terminal and negative terminal; a switch comprising a jump start current sharing circuit electrically connected to the rechargeable battery; and a battery clamp electrically connected to the jump start current sharing circuit, wherein the one or more relays and the one or more FETs are configured to be selectively switched on or off.

The presently described subject matter is directed to a jump starting device for charging a depleted is discharge battery, the device comprising: a rechargeable battery having a positive terminal and negative terminal; a switch comprising a jump start current sharing circuit electrically connected to the rechargeable battery; and a battery clamp electrically connected to the jump start current sharing circuit, further comprising an electrical conductor or bus for electrically connecting the battery clamp to the jump start current sharing circuit.

The presently described subject matter is directed to a jump starting device for charging a depleted is discharge battery, the device comprising: a rechargeable battery having a positive terminal and negative terminal; a switch comprising a jump start current sharing circuit electrically connected to the rechargeable battery; and a battery clamp electrically connected to the jump start current sharing circuit, further comprising an electrical conductor or bus for electrically connecting the battery clamp to the jump start current sharing circuit, wherein the electrical conductor or bus is a copper plate.

The presently described subject matter is directed to a jump starting device for charging a depleted is discharge battery, the device comprising: a rechargeable battery having a positive terminal and negative terminal; a switch comprising a jump start current sharing circuit electrically connected to the rechargeable battery; and a battery clamp electrically connected to the jump start current sharing circuit, wherein the switch is electrically connected to the negative terminal of the rechargeable battery.

The presently described subject matter is directed to a jump starting device for charging a depleted is discharge battery, the device comprising: a rechargeable battery having a positive terminal and negative terminal; a switch comprising a jump start current sharing circuit electrically connected to the rechargeable battery; and a battery clamp electrically connected to the jump start current sharing circuit, wherein the rechargeable battery is a lithium ion battery.

The presently described subject matter is directed to a jump starting device for charging a depleted is discharge battery, the device comprising: a rechargeable battery having a positive terminal and negative terminal; a switch comprising a jump start current sharing circuit electrically connected to the rechargeable battery; and a battery clamp electrically connected to the jump start current sharing circuit, wherein the battery clamp is a negative polarity battery clamp connectable to a negative terminal of the depleted or discharged battery to be charged.

The presently described subject matter is directed to a jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FET) connected together in parallel.

The presently described subject matter is directed to a jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FET) connected together in parallel, and wherein the switch comprises one or more relays and one or more field effect transistors (FETs) arranged in parallel in the jump start current sharing circuit.

The presently described subject matter is directed to a jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FET) connected together in parallel, and wherein the switch comprises a single relay and multiple field effect transistors (FETs) arranged in parallel in the jump start current sharing circuit.

The presently described subject matter is directed to a jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FET) connected together in parallel, and wherein the switch comprises multiple relays and a single field effect transistor (FET) arranged in parallel in the jump start current sharing circuit.

The presently described subject matter is directed to a jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FET) connected together in parallel, and wherein the switch comprises multiple relays and multiple field effect transistors (FETs) arranged in parallel in the jump start current sharing circuit.

The presently described subject matter is directed to a jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FET) connected together in parallel, and wherein the one or more relays and the one or more FETs can be selectively switched on or off.

The presently described subject matter is directed to a jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FET) connected together in parallel, and further comprising an electrical conductor or bus for electrically connecting the battery clamp to the jump start current sharing circuit.

The presently described subject matter is directed to a jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FET) connected together in parallel, further comprising an electrical conductor or bus for electrically connecting the battery clamp to the jump start current sharing circuit, and wherein the electrical conductor or bus is a copper plate.

The presently described subject matter is directed to a jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FET) connected together in parallel, and wherein the jump start current sharing circuit is electrically connected to the negative terminal of the rechargeable battery.

The presently described subject matter is directed to a jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FET) connected together in parallel, wherein the rechargeable battery is a lithium ion battery.

The presently described subject matter is directed to a jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FET) connected together in parallel, wherein the battery clamp is a negative polarity battery clamp connectable to a negative terminal of the depleted or discharged battery to be charged.

BRIEF DESCRIPTION OF THE DRAWINGS

FIG. 1 is a circuit diagram of a jump start current sharing system and circuit according to the present invention.

DETAILED DESCRIPTION OF PREFERRED EMBODIMENTS

A jump start current sharing system 10 for use in a jump starter according to the present invention is shown in FIG. 1.

The jump start current sharing circuit system 10 comprises or consists of:
1) a switch 12 comprising a jump start current sharing circuit comprising or consisting of:
   i) a relay 14 having a switch arrangement 14A, 14B, 14C and a coil arrangement 14D, 14F, 14E;
   ii) a FET1 16 having a GATE 1 16A, the FET1 16 connected in parallel relative to the relay 14;
   iii) a FET2 18 having a GATE 2 18A, the FET2 18 connected in parallel relative to the relay 14;
   iv) a FETN 20 having a GATE N 20A, the FETN 20 connected in parallel relative to the relay 14; and
   v) an electrical conductor (e.g. copper) 22 connected between the relay 14, FET1 16, FET2, 18, FETN 20 and the black (negative) battery clamp 26.
2) a lithium ion battery 24 having a negative terminal connected to the switch 12; and
3) a black (negative) battery clamp 26 connected to the switch 12.

The relay 14 of the switch 12, for example, can be a single relay or multiple relays. The FETs 16, 18, 20 of the switch 12, for example, can be a single FET or multiple FETs.

The electrical conductor 22, for example, is a metal cable or metal plate (e.g. made of copper metal). The electrical conductor 22 is selected or configured to accommodate a significant current from the jump start current sharing circuit 12 to the black (negative) battery clamp 26.

The switch 12 can be provided with various switches to selectively connect the relay 14, FET1 16, FET2 18, FETN 20, for example, depending on the operating ambient conditions (e.g. ambient temperature, jump starter temperature), conditions of the depleted or discharged battery being charged (e.g. depleted or discharged voltage, current, battery temperature), and/or current demands to charge the depleted or discharged battery.

The invention claimed is:

1. A jump starting device for charging a depleted or discharged battery, the device comprising: a rechargeable battery having a positive terminal and a negative terminal; a switch comprising a jumpstart current sharing circuit electrically connected to the rechargeable battery, the jump start current sharing circuit comprising one or more relays and one or more field effect transistors (FETs) arranged in parallel and being configured to provide current from the rechargeable battery to the depleted or discharged battery during the duration of a jump starting operation, wherein current flowing through the switch during the jump starting operation is shared between the one or more relays and the one or more FETs; and a battery clamp electrically connected to the jump start current sharing circuit.

2. The device according to claim 1, wherein the switch comprises a single relay and multiple field effect transistors (FETs) arranged in parallel in the jump start current sharing circuit.

3. The device according to claim 1, wherein the switch comprises multiple relays and a single field effect transistor (FET) arranged in parallel in the jump start current sharing circuit.

4. The device according to claim 1, wherein the switch comprises multiple relays and multiple field effect transistors (FETs) arranged in parallel in the jump start current sharing circuit.

5. The device according to claim 1, wherein the one or more relays and the one or more FETs are configured to be selectively switched on or off.

6. The device according to claim 1, further comprising an electrical connector or bus for electrically connecting the battery clamp to the jump start current sharing circuit.

7. The device according to claim 6, wherein the electrical conductor or bus is a copper plate.

8. The device according to claim 1, wherein the switch is electrically connected to the negative terminal of the rechargeable battery.

9. The device according to claim 1, wherein the rechargeable battery is a lithium ion battery.

10. The device according to claim 1, wherein the battery clamp is a negative polarity battery clamp connectable to a negative terminal of the depleted or discharged battery to be charged.

11. A jump start current sharing method for use in a jump starter for charging a depleted or discharged battery, the method comprising: providing a rechargeable battery; providing a battery clamp connectable to the depleted or discharged battery; and providing a switch between the rechargeable battery and the battery clamp, wherein the switch comprises one or more relays and one or more field effect transistors (FETs) connected together in parallel and being configured to provide current from the rechargeable battery to the depleted or discharged battery during the duration of a jump starting operation, wherein current flowing through the switch during the jump starting operation is shared between the one or more relays and the one or more FETs.

12. The method according to claim 11, wherein the switch comprises a single relay and multiple field effect transistors (FETs) arranged in parallel in the jump start current sharing circuit.

13. The method according to claim 11, wherein the switch comprises multiple relays and a single field effect transistor (FET) arranged in parallel in the jump start current sharing circuit.

14. The method according to claim 11, wherein the switch comprises multiple relays and multiple field effect transistors (FETs) arranged in parallel in the jump start current sharing circuit.

15. The method according to claim 11, wherein the one or more relays and the one or more FETs can be selectively switched on or off.

16. The method according to claim 11, further comprising an electrical conductor or bus for electrically connecting the battery clamp to the jump start current sharing circuit.

17. The method according to claim 15, wherein the electrical connector or bus is a copper plate.

18. The method according to claim 11, wherein the jump start current sharing circuit is electrically connected to the negative terminal of the rechargeable battery.

19. The method according to claim 11, wherein the rechargeable battery is a lithium ion battery.

20. The method according to claim 11, wherein the battery clamp is a negative polarity battery clamp connectable to a negative terminal of the depleted or discharged battery to be charged.

* * * * *